United States Patent
Chand

(10) Patent No.: US 6,873,996 B2
(45) Date of Patent: Mar. 29, 2005

(54) AFFINITY ANALYSIS METHOD AND ARTICLE OF MANUFACTURE

(75) Inventor: Jagdish Chand, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 147 days.

(21) Appl. No.: 10/417,709

(22) Filed: Apr. 16, 2003

(65) Prior Publication Data

US 2004/0210600 A1 Oct. 21, 2004

(51) Int. Cl.[7] .............................................. G06F 7/00
(52) U.S. Cl. ................................................. 707/103
(58) Field of Search ............................ 707/1–10, 102, 707/103

(56) References Cited

U.S. PATENT DOCUMENTS

| | | | |
|---|---|---|---|
| 5,062,074 A | * 10/1991 | Kleinberger | 707/5 |
| 5,931,907 A | * 8/1999 | Davies et al. | 709/218 |
| 6,006,225 A | 12/1999 | Bowman et al. | |
| 6,144,944 A | 11/2000 | Kurtzman, II et al. | |
| 6,185,558 B1 | 2/2001 | Bowman et al. | |
| 6,453,312 B1 | 9/2002 | Goiffon et al. | |
| 6,516,312 B1 | 2/2003 | Kraft et al. | |
| 6,564,213 B1 | 5/2003 | Ortega et al. | |
| 6,678,690 B2 | * 1/2004 | Kobayashi et al. | 707/101 |
| 6,681,247 B1 | * 1/2004 | Payton | 709/217 |
| 2002/0032682 A1 | * 3/2002 | Kobayashi et al. | 707/5 |
| 2002/0038241 A1 | 3/2002 | Hiraga | |
| 2002/0072895 A1 | * 6/2002 | Imanaka et al. | 704/9 |
| 2002/0095409 A1 | * 7/2002 | Takahashi et al. | 707/3 |
| 2003/0046389 A1 | 3/2003 | Thieme | |
| 2003/0088525 A1 | 5/2003 | Velez et al. | |

OTHER PUBLICATIONS

Yi Liu et al., "Affinity Rank: A New Scheme for Efficient Web Search", May 2004, pp. 338–339.*
Minwen Ji, "Affinity–Based Management of Main Memory Database Clusters", Nov. 2002, Volumn 2, pp. 307–339.*
M. Balabanovic et al., "Content–Based, Collaborative Recommendation", Communications of the ACM vol. 40, no. 3, Mar. 1988, pp. 66–72.
H. Kawano et al., "Mondou: Web search engine with textual data mining", 0–7803–3905, IEEE, Mar. 1997, pp. 402–405.
M. Tanaka et al., "Intelligent System for Topic Survey in MEDLINE by Keyword Recommendation and Learning Text Characteristics", Genome Informatics 11: 73–82, 2000, pp. 73–82.

* cited by examiner

Primary Examiner—Uyen Le
Assistant Examiner—Hanh Thai
(74) Attorney, Agent, or Firm—Morrison & Foerster LLP

(57) ABSTRACT

A computer based method of organizing text items comprising: receiving a multiplicity of individual groups of text items; assigning respective unique integer item codes to respective individual text items from the multiplicity of individual groups; identifying pairs of text items from individual groups of the multiplicity of groups; ordering pairs of text items based upon the unique item codes assigned to individual text items of respective pairs of text items such that each respective pair has a respective unique order position relative to other pairs; providing in computer readable media a pair order information structure that stores respective associations between respective identified pairs and their respective unique order positions.

31 Claims, 3 Drawing Sheets

AFFINITY ANALYSIS METHOD AND ARTICLE OF MANUFACTURE

BACKGROUND OF THE INVENTION

1. Field of the Invention

The invention relates in general to information analysis and more particularly to organization of information concerning relationships among pairs of text items.

2. Description of the Related Art

An affinity is a measure of association between different items. A person may want to know an affinity among items in order to identify or better understand possible correlation or relationships between items such as events, interests, people or products. An affinity may be useful to predict preferences. For instance, an affinity may be used to predict that a person interested in one subject matter also is likely to be interested in another subject matter. Specifically, for example, an affinity may be used to predict that a person who purchases a particular book is likely to be interested in purchasing one or more other specific books or that a person who plays a particular video game on-line is likely to be interested in playing one or more other video games.

FIG. 1 is an illustrative drawing of a computer user interface screen showing a hypothetical affinity analysis result. The affinity analysis result shows affinity among three automobiles: Honda Accord Sedan, Toyota Camry and Ford Taurus. In this example, the primary vehicle in the affinity analysis is the Honda Accord Sedan. A left portion of the screen shows user control buttons used to select vehicles for which an affinity analysis is to be performed. In this example, the primary vehicle in the affinity analysis is the Honda Accord Sedan. The other vehicles are the Toyota Camry and the Ford Taurus. The time frame for the analysis is December 2002. A top part of the center portion of the screen shows a Venn diagram style graphical representation of an affinity of Accord Sedan for Camry and of an affinity of Accord Sedan for Taurus. The degree of overlap of the Accord Sedan circle with the Camry circle graphically represents the affinity of the Accord Sedan with the Camry. Likewise, the degree of overlap of the Accord Sedan circle with the Taurus circle graphically represents the affinity of the Accord Sedan with the Camry. The overlaps represent the degree of affinity. A bottom part of the center portion of the screen provides a table showing affinities among the three autos. The top row of the chart shows a numerical measure of the strength of the affinity of the Accord Sedan to the Camry (23.7%) and to the Taurus (3.1%). A middle row shows a strength of the affinity of the Camry to the Accord (30.6%) and Taurus (4.2%). A bottom row shows a strength of the affinity of the Taurus to the Accord (18.3%) and to the Camry (19.2%). A right portion of the screen shows a table that lists strengths of affinities of the primary vehicle in rank order to the fifteen vehicles with the strongest affinities. In this example, the table on the right also lists the affinity of the primary vehicle to each other auto (i.e., Taurus, no. 63) selected on the left for affinity analysis even if the other auto is not in the top fifteen affinities.

An affinity analysis may be used to find similar keywords for a given keyword. For example, the following list is a hypothetical example list of keywords that may be found through a hypothetical affinity analysis to be similar to the keyword "007".

007 Similarity List jamesbond
james bond 007
007.com
007 bond
bond
bond 007
james bond, 007
bond james bond
james bond 007: nightfire
james bond movies
007 nightfire
bond james
bond, james
die another day
james bond website
007 games
james bond characters
james bond nightfire
nightfire
agent 007
die another day movie Many of the above keywords do not even include the term "007", although they have been found to be keywords similar to "007".

One example of a practical use of an affinity analysis is to answer a question of the general type, if a user searches on the internet using a certain keyword, then what else is that user likely to search for on the internet? An affinity analysis can be used to answer this question. The analysis may, for example, result in identification of an ordered list of other keywords with the top 10, 100 or 1000 affinities to the certain keyword. Affinity analysis also can be used to answer questions of the general type, if a person buys flowers, what other things is that person likely to want to buy? These types of questions can be useful for cross-selling and in market research, for example.

Typically, an affinity between items is determined based at least in part upon how frequently items occur together in one or more groupings of items. There are many ways in which to define groupings of items. Examples of groupings that may occur in a computer network environment in connection with an IP address, a transaction identity (TID), a URL or a 'cookie'.

An IP address may be used to identify a particular user's computer. A TID may be used to identify a particular transaction such as a purchase of goods or services. For instance, a user may use a computer with a given IP address to form a connection with an internet accessible server site and to then purchase a number of items over the internet. The given IP address may serve as a group identity (group ID) for a grouping of items consisting of the items purchased together by the user. Also, the purchase transaction may have a TID which can be serve as a group ID for a grouping that includes the purchased items or services.

Groupings of keywords can be associated with a URL. The URL may serve as the group ID, and the keywords can serve as the items in the grouping. Such keyword grouping can be built up over time, for example, by keeping a record of keyword-based internet searches in which a keyword is used to identify a set of URLs, and a user then selects one or more identified URLs to visit a web page on the internet. A database of groupings can be developed over time. Selected URLs serve as group IDs, and the keywords used to identify the URLs are items within the groupings.

An internet cookie can be used to create groupings. Cookies are a general mechanism which server side connections (such as CGI scripts) can use to both store and retrieve information on the client side of the connection. A CGI (Common Gateway Interface) is used to interface an external application with information servers such as HTTP or web-servers. The addition of a simple, persistent, client-side state significantly extends the capabilities of Web-based client/server applications. A server, when returning an HTTP object to a client, may also send a piece of state information which the client will store. Included in that state object is a description of the range of URLs for which that state is valid. Any future HTTP requests made by the client which fall in that range will include a transmittal of the current value of the state object from the client back to the server. The state object is called a cookie. A computer's cookie identifier can serve as a group ID, and information stored with the cookie serve as items in a grouping.

The internet has created enormous opportunities to gather data useful in the study affinities between items. Huge databases comprising groupings such as those based upon IP addresses, TIDs, URLs or cookies can be developed. These databases can evolve over time as new grouping information is added.

One known approach to determining an affinity involves a computation based upon the number of occurrences of items and the number of occurrences of groupings of items. For example, according to this one approach, the affinity for item t1 with item t2 may employ information concerning:

$N(t1)$: number of group IDs that include t1, $N(t2)$: number of group IDs that include t2, $N(t1,t2)$: number of group Ids that include both t1 and t2.

The affinity for item t1 for item t2 may be computed as, $$N(t1,t2)/N(t1)$$

Conversely, the affinity for item t2 for item t1 may be computed as, $$N(t1,t2)/N(t2)$$

While earlier approaches to performing affinity analysis generally have been successful, there have been shortcoming with their use. For example as a database of groupings of items becomes very large, computation involved in performing affinity analysis can become quite challenging. For example, a given database may include groupings of keywords. Each different keyword may be considered to be a different item. Each different grouping may include one, two or several keywords. There may be millions of groupings and millions of keywords. However, the above approach to computing an affinity analysis considers the affinity of only two items at a time. Keeping track of the number of times that any given two keywords occur together in the millions of groupings is a significant task that becomes ever more difficult as the number of keywords and the number of groupings increases and changes over time.

There has been a need for improvement in organizing groups of items for use in an affinity analysis. There also has been a need for improvement in determination of affinity between items. The present invention meets these needs.

SUMMARY OF THE INVENTION

In one aspect, a computer based method of organizing text items is provided. The method is useful in performing affinity analysis, for example. A multiplicity of individual groups of text items are provided. Unique integer item codes are assigned to individual text items. Pairs of text items from individual groups are identified. The text item pairs are ordered based upon the unique item codes assigned to constituent text items of the pairs. As a result, each text item pair is assigned a unique order position relative to the other text item pairs. A pair order information structure is provided in computer readable medium so as to store associations between text item pairs and their unique order positions.

In another aspect of the invention an article of manufacture is provided which includes a computer readable medium encoded with an item count information structure, a code assignment information structure and a pair count information structure. The item count information structure stores counts of occurrences of each of a multiplicity of items from a multiplicity of groupings of items. The code assignment information structure associates respective items with respective unique integer item codes. The pair count information structure stores respective pair counts that indicate respective numbers of occurrences of each of a multiplicity of respective item pairs in one or more of the multiplicity of groupings of items. Pair counts corresponding to individual item pairs are stored in the pair count information structure at locations indexed by pair codes computed from item codes associated in the item code information structure with constituent items of individual item pairs.

Another aspect of the invention provides an article of manufacture that includes a computer readable medium encoded with an item count information structure, a code assignment information structure, computer program code for performing a pair code computation process, and a pair count information structure. The item count information structure stores respective counts of occurrences of each of a multiplicity of respective items in a multiplicity of groupings of items. The code assignment information structure stores associations of items with unique integer item codes. The computer program code computes unique integer value pair codes for pairs of items within one or more of the multiplicity of groupings using unique item codes associated in the code assignment information structure. The pair count information structure stores respective associations of pair codes with counts of occurrences of each of a multiplicity of pairs of items in one or more of the multiplicity of groupings of items.

In other aspects of the invention, improved processes are provided for performing affinity analysis using an item code information structure and a pair code information structure.

The use of integer item codes to represent text items in conjunction with the use of integer pair codes to represent pairs of items makes possible improvements in organization of information relevant to analysis of relationships among text items. More specifically, item code information structures and pair code information structures are especially useful in the organization of large amounts of information relevant to relationships between pairs of text items. The computation of integer pair codes from integer item codes speeds processing involved with evaluating associations among pairs of items. These and other features and advantages of the invention will become more apparent from the following detailed description and drawings.

DETAILED DESCRIPTION OF THE PREFERRED EMBODIMENTS

Figure 1:
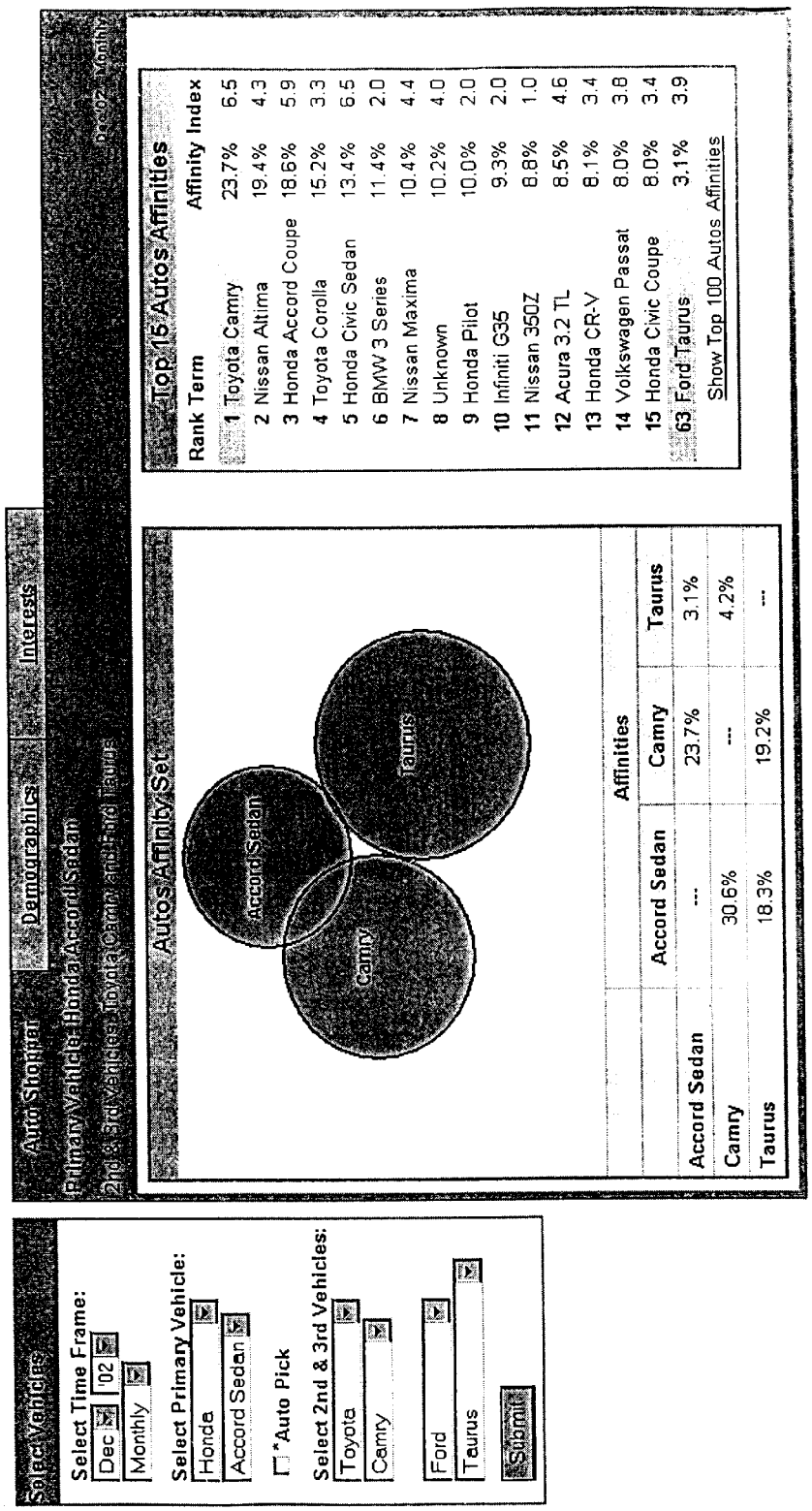
FIG. 1 is an illustrative drawing of a computer user interface screen showing a hypothetical affinity analysis result.

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Overview

In a present embodiment of the invention, text items are organized for use in affinity analysis. A purpose of an affinity analysis is to determine affinities among text items based upon these groupings. A present embodiment of the invention facilitates affinity analysis by providing a novel organization of pairs of text items in which pairs are identified from groupings of items and in which a novel organization of pairs is developed systematically based upon identities of text items within individual pairs. This novel organization of pairs of text items streamlines subsequent affinity analysis.

Developing a novel organization of pairs of text items in accordance with a present embodiment involves assigning unique integer values to individual items of a multiplicity of item groupings. These unique integer values are called item codes. A multiplicity of pairs of items are identified from the multiplicity of groupings. The pairs of text items are ordered relative to one another based upon their item codes. Specifically, individual pairs of text items are ordered relative to other pairs of text items such that each pair has a unique order position relative to the order positions of other pairs.

A novel pair order information structure provided in a computer readable media can store associations between unique pair order positions and other data such as a count of the number of occurrences of such pair in a given database. Thus, item codes can be used to access the pair order information structure during an affinity analysis. For example, during an affinity analysis, the item codes of the constituent items of a given pair of items can be used determine the unique position of the given pair within the pair order information structure. This unique position information can be used to locate information, such as a count, associated by the pair order information structure with the given pair.

In one embodiment of the invention, individual text items are mapped into item codes and individual item pairs of text items are mapped into unique integer values called pair codes. The mapping of individual pairs into individual pair codes is determined based upon the item codes of the text items in the individual pairs. The order positions of individual pairs depend upon the corresponding individual pair codes which in turn, depend upon item codes of constituent items of the individual pairs. During an affinity analysis, the item codes of the constituent items of a given pair of items can be used determine the unique pair code the given pair. This unique position information can be used to locate information, such as a count, associated by the pair order information structure with the given pair.

Text Items and Groupings

As used herein, a text item may include a set of one or more characters such as letters, numbers, symbols, or combinations thereof, for example. The characters may have meaning as words or phrases, but they are not required to have any particular meaning by themselves. Typically, the text items are organized into a multiplicity of groupings according to some rules, which form no part of the present invention. For example, the text items may be grouped together based upon their being associated with the same IP (internet protocol) address, transaction ID (TID), URL or cookie. For instance, a user might make an internet connection with a particular site and engage in an on-line purchase transaction in which the user purchases a book entitled 'Encyclopaedia' and a CD labeled, 'Popular Songs' and tickets to a attend a tour named, 'Luxury Voyage'. A transaction ID for this on-line purchase would be associated with three text items. One would be the text string, 'Encyclopaedia'. Another would be the text string, 'Popular Songs'. Yet another would be the text string, 'Luxury Voyage'.

Assignment of Item Codes

The following is an example of an assignment of item codes for items within groupings of items in accordance with an embodiment of the invention. The following illustrative groupings will be used in this example.

G1={x, y, z}
G2={x, y}
G3={x, z}

For clarity of explanation, only three groupings are used in this example, although in an actual implementation there may be a multiplicity of groupings, perhaps millions of them. G1, G2 and G3 are group identifiers for three illustrative groups. It will be appreciated that G1, G2 and G3 might be different IP addresses, TIDs, URLs, cookies or some other form of group identifier. Moreover, there might even be a mix of types of groupings such that, G1 identifies an IP address, G2 identifies a TID, and G3 identifies a URL, for example. Item x is text item and a constituent of G1, G2 and G3. Item y is text item and constituent of G1, G2 and G3. Item z is text item and a constituent of only G1.

Integer value item codes are assigned selectively to the text items of G1, G2 and G3. For example, item x may be assigned 1; item y may be assigned 2; and item z may be assigned 3. Integer item code assignments should assigned sequentially. Moreover, an item threshold process may be employed to select items to be assigned of item codes. For instance, an item threshold condition may be imposed that requires that an item be present in at least some prescribed minimum threshold number of groupings in order to qualify for assignment of an item code. Such item threshold process is an optional optimization that seeks to ensure that a item codes are assigned only for items that have a prescribed level of usage throughout the multiplicity of groupings. In this example, if the item threshold is set to be two, then items x and y would receive item codes, but item z would not. If instead the item threshold was set to be three then only item x would receive an item code.

An item code information structure is created that associates text items with unique integer item codes. Assuming that the item threshold is set to one, then a possible item code information structure for the items in this example can be a table as follows.

| Item Code Information Structure | |
|---|---|
| TEXT ITEM | ITEM CODE |
| Item x | 1 |
| Item y | 2 |
| Item z | 3 |

The item code information structure provides a mapping of selected text items to assigned item codes. The above table is just one example of a type of structure that can be used to map items to item codes. The item code information structure may be stored in a computer readable storage medium.

Identifying Item Pairs

The following is an example of identification of item pairs within groupings of items in accordance with an embodiment of the invention. The illustrative groupings shown above will be used in this example. In one embodiment, pairs are identified only for items that passed an item threshold process. If the item threshold was set at one, then the identified pairs would be identified for G1, G2 and G3: (x, y), (x, z), (y, z). If the item threshold was set at two then the identified pair would be (x, y).

In accordance with an embodiment of the invention, item pairs are represented in terms of the item codes of their constituent items. If the item threshold was set at one, and the assigned item codes are x=1, y=2 and z=3, then the item pairs would be represented as (1, 2), (1, 3), (2,3). If the item threshold was set at two, and the assigned item codes are x=1 and y=2, then the item pair would be represented as (1, 2).

Thus, an item code information structure associates text items with item codes. These item codes are used to represent item pairs. As explained below, the unique item codes of pairs of items are used to order the item pairs such that each pair has a unique order position relative to other pairs. In one embodiment, unique item codes of constituent items of individual pairs are used to compute individual unique pair codes that prescribe the individual unique order positions of the individual pairs.

Ordering Pairs of Text Items

The charts below illustrate examples of ordering of pairs based upon pair codes of constituent text items such that each pair has a unique order position relative to the order positions of other pairs. Each of these charts shows a different possible ordering of item pairs based upon the item codes of constituent items in the pairs. For the sake of brevity and clarity of explanation these examples include only six item pairs each.

These charts illustrate alternative orderings of item pairs. Each chart illustrates a grouping of item pairs based upon one of higher or lower value item codes of the pairs. Specifically, each row of a chart holds a different item code group that is grouped based upon one of the higher or lower value item codes. Each chart further illustrates a prescribed ordering of grouped item pairs. Each chart further illustrates a prescribed ordering of pairs within groups of item pairs.

Referring to Chart 1 for example, the integer values in the left side of the individual chart locations indicate the order position of the item pair in that location. For example, pair (1,2) is in order position "1", and pair (2,4) is in order position "5". The top row has a group of pairs with lower value item code equal to the integer 1. The middle row has a group of pairs with lower value item code equal to the integer 2. The bottom row has a group of pairs with lower value item code equal to the integer 3.

Chart 1 illustrates an ordering of item pairs in which items are grouped based upon lower value item codes. For example, in the item code pair (1,2), 1 is the lower value item code, and 2 is the higher value item code.

Chart 1 illustrates an ordering of groups in which groups with lesser lower value item codes precede groups with higher lower value item codes (reading rows top to bottom). Thus, pairs of the group {(1,2), (1,3), (1,4)} are ordered before (above) pairs of the group {(2,3), (2,4)}. Similarly, pairs of the group {{(2,3), (2,4)} are ordered before (above) the pair of the group {(3,4)}.

Chart 1 illustrates an ordering of pairs within groups in which pairs with lesser higher value item codes precede pairs with greater higher value item codes (reading columns right to left). Thus pairs of group {(1,2), (1,3), (1,4)} are ordered with pair (1,2) first, followed by (1,3) second, followed by (1,4), third.

CHART 1

| Lower Value Groups/Lesser Lower Value First Inter-Group Ordering/Lesser Higher First Intra-Group Ordering | | | |
|---|---|---|---|
| 1 X | 1 (1, 2) | 2 (1, 3) | 3 (1, 4) |
| 2 X | X | 4 (2, 3) | 5 (2, 4) |
| 3 X | X | X | 6 (3, 4) |
| 4 X | X | X | X |

Chart 2 illustrates an ordering of item pairs in which items are grouped based upon lower value item codes. The groups are ordered such that groups with lesser lower value item codes precede (are above) groups with greater lower value item codes. Pairs within groups are ordered such that pairs with greater higher value item codes precede pairs with lesser higher value item codes. Thus pairs of group {(1,4), (1,3), (1,2)} are ordered with pair (1,4) first, followed by (1,3) second, followed by (1,4), third.

CHART 2

| Lower Value Groups/Lesser Lower Value First Inter-Group Ordering/Greater Higher First Intra-Group Ordering | | | |
|---|---|---|---|
| 1 X | 1 (1, 4) | 2 (1, 3) | 3 (1, 2) |
| 2 X | X | 4 (2, 4) | 5 (2, 3) |
| 3 X | X | X | 6 (3, 4) |
| 4 X | X | X | X |

Chart 3 illustrates an ordering of item pairs in which items are grouped based upon higher value item codes. The groups are ordered such that groups with greater higher value item codes precede (are above) groups with lesser higher value item codes. Thus, for example, group {(1,4), (2,4), (3,4)} precedes group {(1,3), (2,3)}. Pairs within groups are ordered such that pairs with lesser lower value item codes precede pairs with greater lower value item codes. Thus, for example, pairs of group {(1,4), (2,4), (3,4)} are ordered with pair (1,4) first, followed by (2,4) second, followed by (3,4), third.

CHART 3

Higher Value Groups/Greater Higher Value
First Inter-Group Ordering/Lesser Lower
First Intra-Group Ordering

| 1 X | 1 (1, 4) | 2 (2, 4) | 3 (3, 4) |
|---|---|---|---|
| 2 X | X | 4 (1, 3) | 5 (2, 3) |
| 3 X | X | X | 6 (1, 2) |
| 4 X | X | X | X |

Chart 4 illustrates an ordering of item pairs in which items are grouped based upon higher value item codes. The groups are ordered such that groups with greater higher value item codes precede (are above) groups with lesser higher value item codes. Thus, for example, group {(3,4), (2,4), (1,4)} precedes group {(2,3), (1,3)}. Pairs within groups are ordered such that pairs with greater lower value item codes precede (reading from left to right) pairs with lesser lower value item codes. Thus, for example, pairs of group {(3,4), (2,4), (1,4)} are ordered with pair (3,4) first, followed by (2,4) second, followed by (1,4), third.

CHART 4

Higher Value Groups/Greater Higher Value
First Inter-Group Ordering/Greater Lower
First Intra-Group Ordering

| 1 X | 1 (3, 4) | 2 (2, 4) | 3 (1, 4) |
|---|---|---|---|
| 2 X | X | 4 (2, 3) | 5 (1, 3) |
| 3 X | X | X | 6 (1, 2) |
| 4 X | X | X | X |

These charts illustrate just four possible systematic approaches to ordering of item pairs based upon item codes in accordance with the principles of the invention. The assignment of item codes to items permits pairs of items to be represented by the item codes of their constituent items. The above charts illustrate that the pairs of item codes associated with individual items can be employed to deterministically order the pairs such that each pair has a unique order position relative to other pairs. Significantly, each individual pair has a unique order position that is determined based upon a pair of unique item codes assigned to the items that make up the pair.

Computation of Order Position

An order position can be calculated through mathematical computation. The following process includes mathematical computations used to compute the item pair order positions illustrated in Chart 1. Individual order positions of individual pairs are determined based upon item codes assigned to the constituent items of the individual pairs.

The following process can be implemented using computer program code encoded in a computer readable medium. The process computes a unique integer pair code value for given arbitrary item pair (t1,t2) in accordance with an embodiment of the invention. It is assumed that item codes have been assigned for each item of the given item pair. It is further assumed that associations between the items in the pair and item codes assigned to those items have been stored in an item code information structure. It is further assumed that MAX is the greatest item code that has been assigned to any item.

An initial step is to produce an ordered item code pair for the given item pair in which a lower value item code is ordered first, and a higher value item code is ordered second. Thus, for item pair (t1,t2), an item code for t1 and an item code for t2 are retrieved from an item code information structure. It is assumed that for the given item code pair (t1,t2), code1 is the item code that has been assigned to text item t1, and code2 is the item code that has been assigned to text item t2.

In accordance with the pair ordering process,

If (code 2=MAX), then paircode (t1, t2)=code1*MAX−SUM (x) where x=1 to code1,

Else pair (t1, t2)=(code2−code1)+(code1−1)*MAX−SUM (x) where x=1 to code1−1.

For the example set of pair codes of Chart 1, MAX=4.

The following are examples of the computation of unique pair codes and corresponding unique order positions for a representative sampling of the item code pairs of Chart 1.

For the pair of item codes (1,2), code2=2. Therefore, for (1,2), code2≠MAX. Thus, paircode(1,2)=(2−1)+(1−1)×4−(0)=1.

For the pair of item codes (2,3), code2=3. Therefore, for (2,3), code2≠MAX. Thus, paircode(2,3)=(3−2)+(2−1)×4−(1)=4.

For the pair of item codes (2,4), code2=4. Therefore, for (2,4), code2=MAX. Thus, paircode(2,4)=(2×4)−(1+2)=5.

This computation process can be employed to build up a database of information concerning item pairs. This same computation process can be used to access that database of information to retrieve stored information concerning the item pairs. During database build up, pair codes computed through the computation process can be used to determine the locations in a storage medium where information associated with individual item pairs is to be stored. Subsequently, assuming that information for individual item pairs in fact has been stored in memory locations determined by their pair codes, the same computation process can be used to compute the pair code for a given item pair in order to locate and retrieve from the storage medium, information related to the item pair. It will be appreciated, of course, that a database of information may be continually built up and revised. Therefore, continued build up and retrieval may occur concurrently.

Furthermore, this computation process can be used create a database of item pair information that can be searched very efficiently. As explained above, unique pair codes may represent unique order positions of item pair related information. Pursuant to one aspect of the invention, pair order position is determined based upon the computation process, and item pair related information is stored in a computer readable medium in order position order. As a result, a linear scan type process can be used more readily to locate stored item pair related information. During information retrieval, locations to be accessed to retrieve item pair related information are computed using the computation process. If item pair information has been stored in unique position order determined by the computation process, then the computation process can be used to compute a linear sequence of locations to be accessed within the storage medium.

For instance, referring to the hypothetical example of Chart 1, the correlation between item codes and pair codes for the top row is as follows.

item code pair(1,2)→pair code=1 item code pair=(1,3)→pair code=2 item code pair=(1,4)→pair code=3

A hypothetical example of a correlation between pair code and memory address locations is as follows.

pair code=1→Memory location 1000
pair code=2→Memory location 1001
pair code=3→Memory location 1002

Thus, it will be apprecitated that all pair related information associated with an item with item code=1 can be accessed through a linear scan search of the storage medium starting with location 1000, followed by 1001 and ending with 1002.

The above example charts each contain only six item code pairs and only six corresponding pair codes. In an actual implementation there may be millions of items and millions of pairs. Since the process for ordering item pairs is scaleable, the same basic pair ordering process can be used to determine item pair order positons and item pair codes for large numbers of pairs. In fact, the benefits of the process in ordering pairs and achieving efficient information storage strategies becomes more evident with increased numbers of items and pairs.

While Charts 1–4 provide examples of four possible orderings of pairs in accordance with the principles of the invention, persons skilled in the art will appreciate that other orderings also may be possible within the scope of the invention. Moreover, while a specific computation process has been described for computing pair codes for the example ordering of Chart 1, it is believed that persons skilled in the art can readily apprecaite that similar basic computation principles can be applied to arrive at computation processes for pair orderings of the type shown in example Charts 2–4 as well.

Organizing Affinity Analysis Information

Figure 2:
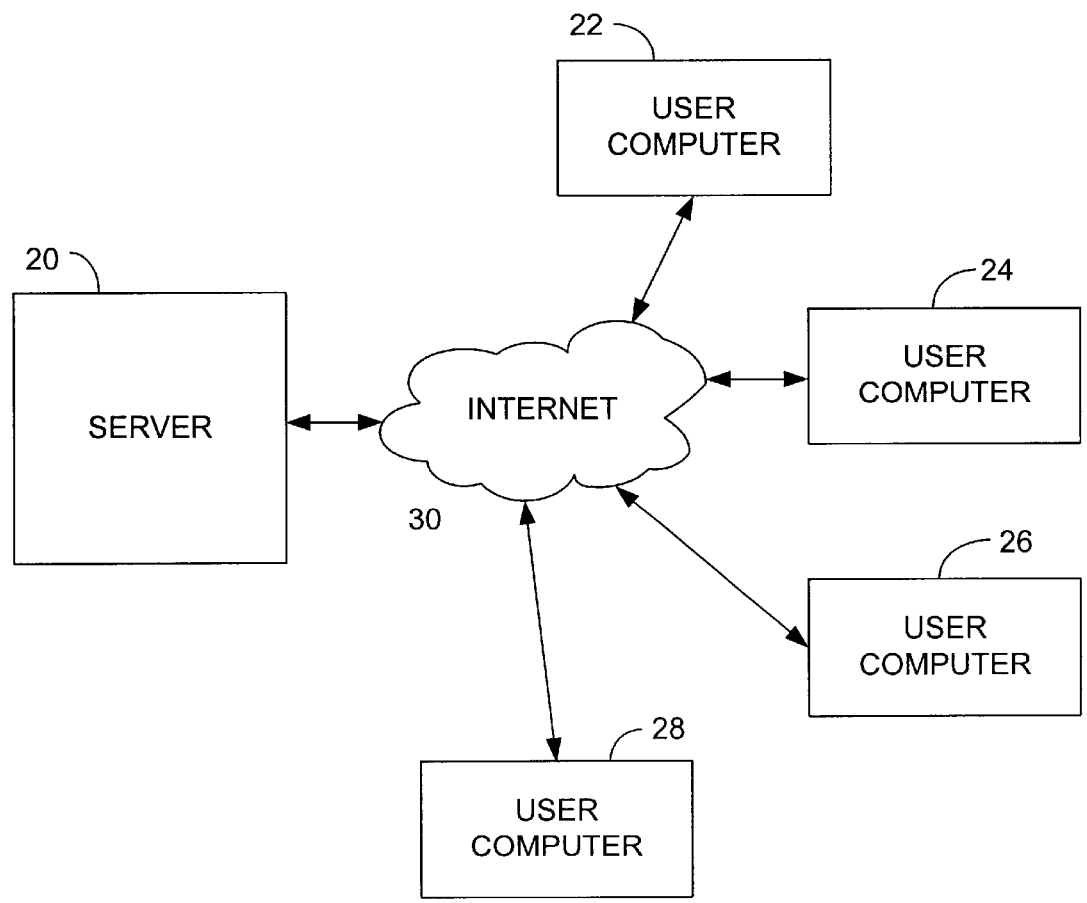
FIG. 2 is an illustrative block diagram showing one internet environment context in which the principles of the invention can be applied.

FIG. 2 is an illustrative block diagram showing one internet computing context in which the principles of the invention can be applied. A server system 20 communicates with a multiplicity of internet-connected computer devices 22, 24, 26 and 28 through the internet 30. The server 20 may be an Internet portal such as the yahoo site: yahoo.com and all properties of yahoo, for example. User from computer (22–28) comes to this site to get various information and services e.g. search, mail finance etc. Data collected in this process will be used to do affinity analyses. The computer devices 22–28, for example, may be any user devices used to login to the computer and accessing information over the internet from server 20.

The server 20 gathers groupings of text items through interaction over the internet 30 with computers 22–28. It will be appreciated that the server 20 may communicate with millions of computers every day, although only four representative computers 22–28 are shown in FIG. 2. For example, computers 22–28 may make various requests for information or services. These requests can involve groupings of text items as explained above. The server can process these groupings in order to create a database of information useful for affinity analysis.

The groupings of text items received from user computers 22–28 constitutes input data that is processed to create a database of information useful for affinity analysis. Items in groupings are identified. Item codes are assigned to the items. For example, separate item codes may be assigned to each of the following text items.

Honda
Honda Motor
Honda Motor Company

As explained above, a threshold process may be employed to weed out items with de minimus usage for which item codes are not assigned. An item code information structure is created in computer readable medium that stores associations between items and their assigned item codes.

In addition, pairs of items in the groupings in the input data are identified. Pair codes are computed for selected pairs of items for which a corresponding pair of item codes have been assigned. The computation process described above in reference to Chart 1 may be employed to compute pair codes from item codes.

Figure 3:
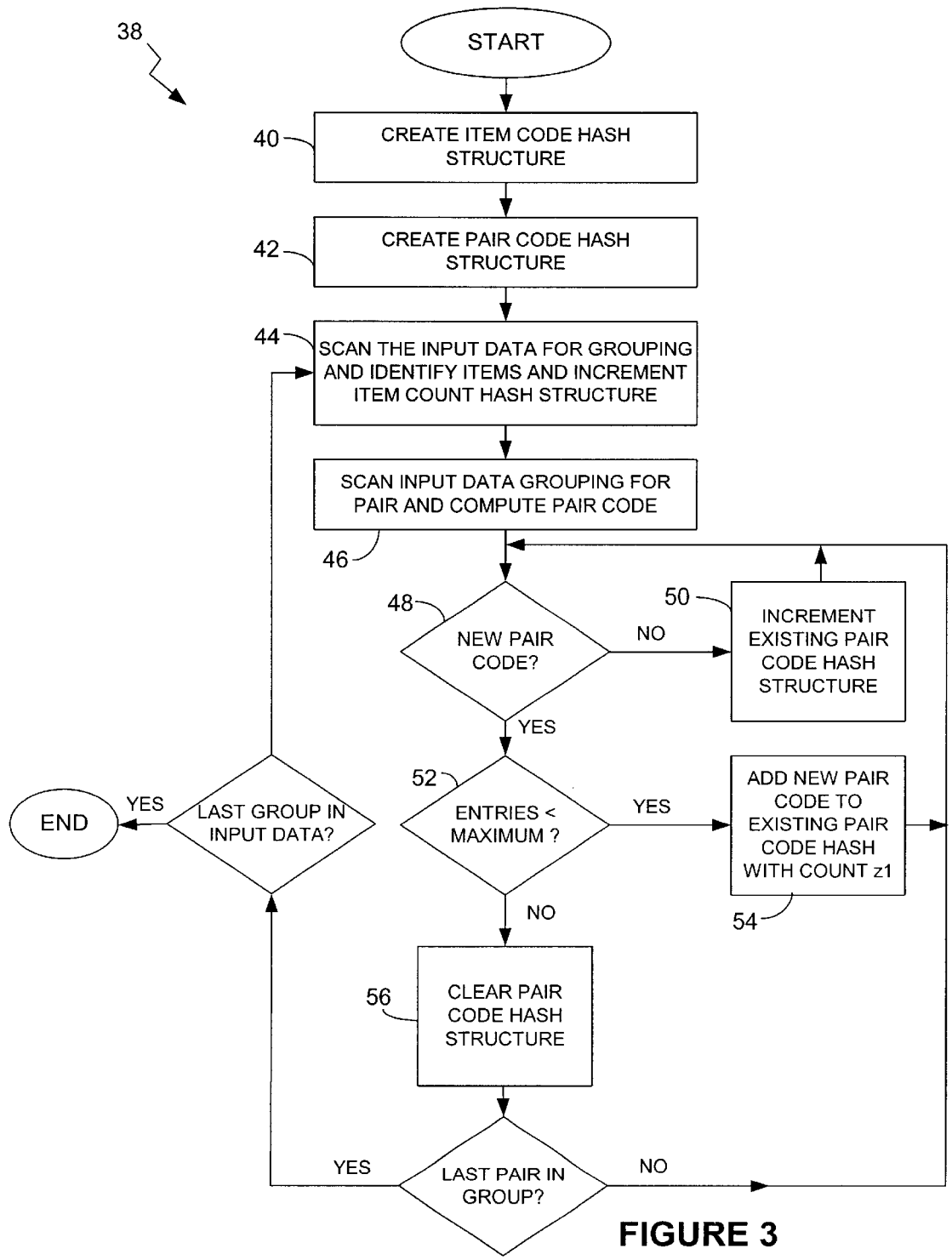
FIG. 3 is an illustrative flow diagram that shows a process for producing information structures in computer readable medium for use in accordance with an embodiment of the invention.

FIG. 3 is an illustrative flow diagram that shows a process 38 using item codes and pair codes to produce information structures in computer readable medium for use in affinity analysis. In step 40, an item count hash structure is provided in which item names are mapped to codes and count. Threshold can be applied in this stage so that only items which are above thresholds are placed in this hash structure. In a present embodiment, the item count hash structure includes a hash table with item codes and item counts. In step 42, a pair count hash structure is provided in which pair codes are mapped to item pair counts. In a present embodiment, the pair count hash structure includes a hash table with pair codes and pair counts.

In step 44, the input data is scanned. For each identified grouping of items, a determination is made as to whether there exist item codes for the items in the group. For items for which item codes already exist, the corresponding item code count in the item code count hash structure is incremented. In a present embodiment, items for which an item code does not yet exist, are ignored as they are below threshold and not significant for analyses.

In step 46, the input data is scanned. For each identified grouping of items, an item code is identified for each item in the grouping, and a pair code is computed for each item pair identified in the grouping. A computation process such as that described above with reference to Chart 1 is used to compute pair codes.

For each such grouping in the input data, the pair count hash structure is updated as follows. In step 48 a determination is made as to whether or not the pair code already is entered in the pair count hash structure. If the pair code for a given item pair already exists in the pair count hash structure, then in step 50, the count corresponding to that pre-existing pair code is incremented by one. If not, then in step 52, a determination is made as to whether the number of entries in the pair count hash structure is less than a MAXIMUM number of allowed entries. If it is less than MAXIMUM, then in step 54, the new pair code is added to the structure with an associated count=1. If the number of entries equals (or exceeds) MAXIMUM, then in step 56, all entries in the pair count hash structure are sorted by pair code to a pair count intermediate information structure. The pair count hash structure is cleared, and the new pair code is added to the newly cleared structure along with an associated count=1 entry.

This above process repeats until all groupings in the input data have been processed. When the scan of the input data has been completed, all item-related information in the item count hash structure is written to an item count information structure. Similarly, when the scan of the input data has been completed, all pair-related information in the pair count hash structure is written to a pair count intermediate information structure. Then all pair count intermediate information structure are merged together and pairs with count above threshold are written to pair count information structure, sorted by pair code.

The following tables are examples of an item code structure, an item count information structure and a pair count information structure that may be produced according to the process of FIG. 3. The information contained in these structures is encoded in a computer readable medium accessed by server 20. It will be appreciated that these structures are just hypothetical examples created for the purpose of explanation. Moreover, for the sake of brevity and clarity of explanations, only a very few items and pairs are listed in these structures. However, persons skilled in the art will appreciate that the same principles apply for large number of items and pairs.

Item Code Structure

| TEXT ITEM | ITEM CODE |
|---|---|
| A | 1 |
| B | 2 |
| C | 3 |
| D | 4 |

Item Count Information Structure

| ITEM CODE | ITEM COUNT |
|---|---|
| 1 | 10 |
| 2 | 20 |
| 3 | 15 |
| 4 | 30 |

Pair Count Information Structure

| PAIR CODE | ASSOCIATED ITEM CODES | PAIR CODE COUNT |
|---|---|---|
| 1 | (1, 2) | 5 |
| 2 | (1, 3) | 6 |
| 3 | (1, 4) | 7 |
| 4 | (2, 3) | 4 |
| 5 | (2, 4) | 5 |
| 6 | (3, 4) | 4 |

AFFINITY ANALYSIS EXAMPLE

The information structures in the example above can be used to perform affinity analysis.

For example, using these structures the affinity of text item A for text item B can be determined as follows. For the purpose of this example, the affinity of A to B is defined as count(A,B)/countA.

Retrieve the item codes for text items A and B from the Item Code Information Structure. The item code for A is 1. The item code for B is 2. Use the item codes as indexes into the Item Count Information Structure and retrieve the item count for A. The item count for A is 10. Use a computation process to compute a pair code for the item pair (A,B) using the pair of item codes for A and B, i.e. item code pair (1,2). In this example, the computation process yields pair code 1. Use the computed pair code 1 as an index into the pair count information structure and retrieve the pair count for pair code 1. The retrieved pair count is 5, which means that the pair count of (A,B) is 5. Therefore, the affinity of A for B is 5/10=0.50.

Conversely, for example, using these structures the affinity of text item B for text item A can be determined using the same procedure. For the purpose of this example, the affinity of A to B is defined as count(A,B)/countB. The example Structures above can be used to ascertain that countB=20, and count(A,B)=5. Therefore the affinity of B for A is, 5/20=0.25.

Persons skilled in the art will appreciate that affinity information can be analyzed. For example, a comparison of affinities such as A for B and B for A can be to decide what text items are the most meaningful. For example, affinity information can be used to get list of items which have high affinity to the give item, sorted by affinity. For instance, in FIG. 1 in left hand side table there is a list of the car models which have affinity to the primary model. In that example, affinity is computed for all pairs, in which primary model is one of the item. Then these items are sorted by affinity. Using a current implementation of the invention, entire whole analyses can be done in one scan.

It will be understood that the foregoing description and drawings of preferred embodiments in accordance with the present invention are merely illustrative of the principles of the invention. Various modifications can be made by those skilled in the art without departing from the spirit and scope of the invention.

What is claimed is:

1. A computer based method of organizing text items comprising:
   receiving a multiplicity of individual groups of text items;
   assigning respective unique integer item codes to respective individual text items from the multiplicity of individual groups;
   identifying pairs of text items from individual groups of the multiplicity of groups;
   ordering pairs of text items based upon the unique item codes assigned to individual text items of respective pairs of text items such that each respective pair has a respective unique order position relative to other pairs;
   providing in computer readable media a pair order information structure that stores respective associations between respective identified pairs and their respective unique order positions.

2. The method of claim 1, wherein ordering pairs of text items further includes:
   identifying respective lower value item code values and higher value item code values assigned to respective individual text items of respective pairs;
   identifying respective groups of pairs of text items having a prescribed one of identical lower value item codes assigned to respective individual text items or identical higher value item codes assigned to respective individual text items;
   determining respective order positions of respective identified pairs by,
   ordering the respective identified groups of pairs in a prescribed numerical order based upon the prescribed one of respective lower value item codes or higher value item codes assigned to respective individual text items of the respective groups of pairs; and
   ordering respective pairs within respective groups of pairs in a prescribed numerical order based upon one of the lower value item codes or the higher value item codes assigned to respective text items of the pairs of the respective groups of pairs.

3. The method of claim 2 further including:
   assigning respective unique integer pair code values to the respective pairs in a numerical order according to their respective order positions.

4. The method of claim 2 further including:
assigning respective unique integer pair code values to the respective pairs in a numerical order according to their respective order positions;
wherein the pair order information structure stores respective associations between respective identified pairs and their respective assigned unique pair code values.

5. The method of claim 1 further including:
providing in computer readable media an item code information structure that associates text items with assigned unique integer item codes.

6. The method of claim 2 further including:
providing in computer readable media an item code information structure that associates text items with assigned unique integer item codes; and
assigning respective unique integer pair code values to the respective pairs in a numerical order according to their respective order positions;
wherein the pair order information structure stores respective associations between respective identified pairs and their respective assigned unique pair code values.

7. The method of claim 1, wherein ordering pairs of text items further includes:
identifying respective lower value item code values and higher value item code values assigned to respective individual text items of respective pairs;
identifying respective groups of pairs of text items having a prescribed one of identical lower value item codes assigned to respective individual text items or identical higher value item codes assigned to respective individual text items; and
determining respective order positions of respective identified pairs by,
ordering the respective identified groups of pairs in a prescribed numerical order based upon the prescribed one of respective lower value item codes or higher value item codes assigned to respective individual text items of the respective groups of pairs; and
ordering respective pairs within respective groups of pairs in a prescribed numerical order based upon the other of lower value item codes or the higher value item codes assigned to respective text items of the pairs of the respective groups of pairs.

8. The method of claim 6,
wherein the prescribed one is respective lower value item codes; and
wherein the other is the higher value item codes.

9. The method of claim 6,
wherein the prescribed one is respective higher value item codes; and
wherein the other is the lower value item codes.

10. The method of claim 1, wherein ordering pairs of text items further includes:
identifying respective groups of pairs of text items having identical lower value item codes assigned to respective individual text items; and
determining respective order positions of respective identified pairs by,
ordering the respective identified groups of pairs in a prescribed numerical order based upon the respective lower value item codes assigned to respective individual text items of the respective groups of pairs; and
ordering respective pairs within respective groups of pairs in a prescribed numerical order based upon respective higher value item codes assigned to respective text items of the pairs of the respective groups of pairs;
assigning respective unique integer pair code values to the respective pairs in a numerical order according to their respective order positions;
wherein the pair order information structure stores respective associations between respective identified pairs and their respective assigned unique pair code values; and further including;
providing in computer readable media an item code information structure that associates text items with assigned unique integer item codes.

11. The method of claim 1, wherein ordering pairs of text items further includes:
identifying respective lower value item code values and higher value item code values assigned to respective individual text items of respective pairs;
identifying respective groups of pairs of text items having a prescribed one of identical lower value item codes assigned to respective text items or identical higher value item codes assigned to respective text items; and
determining respective order positions of respective identified pairs by,
assigning respective unique integer pair code values to the pairs such that,
if the prescribed one is identical lower value item codes then,
each pair has an assigned pair code value that is greater than that of groups of pairs with lesser lower value item codes and that is less than that of groups of pairs with greater lower value item codes; and
each pair has an assigned pair code value that is greater than that of pairs in its group of pairs with lesser higher value item codes and that is less than that of pairs in its group of pairs with greater higher value item codes; and
if the prescribed one is identical higher value item codes then,
each pair has an assigned pair code value that is less than that of groups of pairs with greater higher value item codes and that is greater than that of groups of pairs with lesser higher value item codes; and
each pair has an assigned pair code value that is less than that of pairs in its group of pairs with greater lower value item codes and that is greater than that of pairs in its group of pairs with lesser lower value item codes.

12. The method of claim 1, wherein ordering pairs of text items further includes:
identifying respective lower value item code values and higher value item code values assigned to respective individual text items of respective pairs;
identifying respective lower value item code values and higher value item code values assigned to respective individual text items of respective pairs;
identifying respective groups of pairs of text items having identical lower value item codes assigned to respective text items;
assigning unique integer pair code values to the pairs such that,
each pair has an assigned pair code value that is greater than that of groups of pairs with lesser lower value item codes and that is less than that of groups of pairs with higher lower value item codes; and
each pair has an assigned pair code value that is greater than that of pairs in its group of pairs with lesser higher value item codes and that is less than that of pairs in its group of pairs with greater higher value item codes.

13. The method of claim 1 wherein ordering pairs of text items further includes:
performing a mathematical computation that determines respective unique order positions of respective pair codes based upon respective unique item codes assigned to respective individual text items of respective pairs.

14. The method of claim 1,
wherein ordering pairs of text items further includes performing a mathematical computation that determines respective unique order positions of respective pair codes based upon respective unique item codes assigned to respective individual text items of respective pairs; and
wherein the pair order information structure stores respective associations between respective identified pairs and their respective determined unique pair code values.

15. The method of claim 1,
wherein receiving includes receiving the multiplicity of individual groups of text items from a computer network.

16. A computer based method of organizing text items comprising:
receiving a multiplicity of individual groups of text items;
assigning respective unique integer value item codes to respective individual text items from the multiplicity of individual groups;
providing in computer readable media an item code information structure that associates text items with assigned unique integer item codes;
identifying pairs of text items from individual groups of the multiplicity of groups;
determining respective order positions of respective identified pairs by,
ordering the respective identified groups of pairs in a prescribed numerical order based upon the prescribed one of respective lower value item codes or higher value item codes assigned to respective individual text items of the respective groups of pairs; and
ordering respective pairs within respective groups of pairs in a prescribed numerical order based upon one of the lower value item codes or the higher value item codes assigned to respective text items of the pairs of the respective groups of pairs;
assigning respective unique integer pair code values to the respective pairs in a numerical order according to their respective order positions; and
providing in computer readable media a pair order information structure that stores respective associations between respective identified pairs and their respective pair code values.

17. A computer based method of organizing text items comprising:
receiving a multiplicity of individual groups of text items;
assigning respective unique integer item codes to respective individual text items from the multiplicity of individual groups;
providing in computer readable media an item code information structure that associates text items with assigned unique integer value item codes;
identifying pairs of text items from individual groups of the multiplicity of groups;
ordering pairs of text items by performing a mathematical computation that determines respective unique order positions of respective pair codes based upon respective unique item codes assigned to respective individual text items of respective pairs; and
providing in computer readable media a pair order information structure that stores respective associations between respective identified pairs and their respective determined unique pair code values.

18. An article of manufacture comprising:
a computer readable medium encoded with,
an item count information structure that stores respective counts of occurrences of each of a multiplicity of respective items in a multiplicity of groupings of items;
a code assignment information structure that associates respective items with respective unique integer item codes; and
a pair count information structure that stores respective pair counts that indicate respective numbers of occurrences of each of a multiplicity of respective item pairs in one or more of the multiplicity of groupings of items;
wherein respective pair counts are respectively stored in the pair count information structure at locations indexed by respective pair codes computed from respective item codes associated in the item code information structure with respective constituent items of respective item pairs.

19. An article of manufacture comprising:
a computer readable medium encoded with,
an item count information structure that stores respective counts of occurrences of each of a multiplicity of respective items in a multiplicity of groupings of items;
a code assignment information structure that stores respective associations of respective items with respective unique integer item codes;
computer program code for performing a pair code computation process that computes respective unique integer value pair codes for respective pairs of items within one or more of the respective multiplicity of groupings using respective unique item codes associated in the code assignment information structure; and
a pair count information structure that stores respective associations of respective pair codes with respective counts of occurrences of each of a multiplicity of respective pairs of items in individual ones of the multiplicity of groupings of items.

20. The article of manufacture of claim 19,
wherein the item count information structure stores respective counts of occurrences of each of a multiplicity of respective items in individual ones of a multiplicity of groupings of items.

21. The article of manufacture of claim 19,
wherein the item count information structure includes an item count hash table; and
wherein the pair count information structure includes a pair count hash table.

22. The article of manufacture of claim 19,
wherein the item count information structure and the code assignment information structure are combined in one information structure.

23. The article of manufacture of claim 19,
wherein the pair count information structure stores respective associations of respective pair codes with respective counts in a prescribed numerical order based upon pair code integer values.

24. The article of manufacture of claim 19,
wherein the pair count information structure stores respective associations of respective pair codes with respective counts in a prescribed sequential numerical order based upon pair code integer values.

25. The article of manufacture of claim 19,
wherein the computer readable medium is further encoded with,
an affinity determination process for determining an affinity between a selected pair of items from the multiplicity of groupings of items by comparing a count associated by the item count information structure with one of the items of the selected pair with a count associated by the pair count information structure with the selected pair.

26. A method of determining an affinity between text items comprising:
providing in computer readable media an item count information structure that stores respective counts of occurrences of each of a multiplicity of respective items in individual ones of a multiplicity of groupings of items;
providing in computer readable media a item code assignment information structure that stores respective associations of respective items with respective unique integer item codes;
providing in computer readable media a pair count information structure that stores respective associations of respective unique integer value pair codes with respective counts of occurrences of each of a multiplicity of respective pairs of items in one or more of the multiplicity of groupings of items;
designating a pair of items consisting of two text items;
determining two item codes for the two designated text items of the designated pair using the item code assignment information structure;
computing a respective unique integer value pair code for the designated pair of text items of the designated pair using the determined two item codes;
determining an item count for at least a respective one of the two designated items of the designated pair using at least a respective one of the two determined item codes to search the item count information structure;
determining a pair count using the computed unique integer value pair code to search the pair count information structure; and
comparing the determined at least one item count with the determined pair code count.

27. The method of claim 26,
wherein the pair count information structure stores respective associations of respective unique integer value pair codes with respective counts in a prescribed sequential numerical order based upon pair code integer values.

28. The method of claim 26,
wherein the pair count information structure stores respective associations of respective unique integer value pair codes with respective counts in a prescribed sequential numerical order based upon pair code integer values; and
wherein determining the pair count involves scanning at least a portion of the pair count information structure in the prescribed sequential numerical order in search of a match to the computed unique integer value pair code.

29. A method of determining an affinity between text items comprising:
providing in computer readable media an item count information structure that stores respective counts of occurrences of each of a multiplicity of respective items in individual ones of a multiplicity of groupings of items;
providing in computer readable media a item code assignment information structure that stores respective associations of respective items with respective unique integer item codes;
providing in computer readable media a pair count information structure that stores respective associations of respective unique integer value pair codes with respective counts of occurrences of each of a multiplicity of respective pairs of items in one or more of the multiplicity of groupings of items;
designating a plurality of respective pairs of items consisting of two respective text items each;
respectively determining two respective item codes for each pair of two respective designated text items using the item code assignment information structure;
respectively computing respective unique integer value pair codes for each respective designated pair of text items using respective determined two item codes;
respectively determining respective item counts for respective one of respective two designated items for each respective pair using the respective one to search the item count information structure;
respectively determining respective pair counts for each respective pair using respective computed unique integer value pair codes to search the pair count information structure;
respectively comparing the respective determined at least one item count with the respective determined pair code count for each respective pair to produce respective individual affinities; and
comparing the individual affinities.

30. The method of claim 29,
wherein the pair count information structure stores respective associations of respective unique integer value pair codes with respective counts in a prescribed sequential numerical order based upon pair code integer values.

31. The method of claim 29,
wherein the pair count information structure stores respective associations of respective unique integer value pair codes with respective counts in a prescribed sequential numerical order based upon pair code integer values; and
wherein respectively determining respective pair counts involves respectively scanning at least a portion of the pair count information structure in the prescribed sequential numerical order in search of respective matches to respective computed unique integer value pair codes.

* * * * *